March 14, 1961  A. JOHNSON  2,974,504
AUTOMATIC FAN CONTROL
Filed April 21, 1958
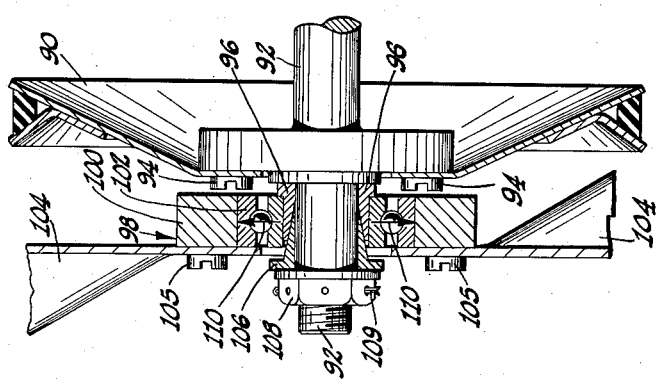
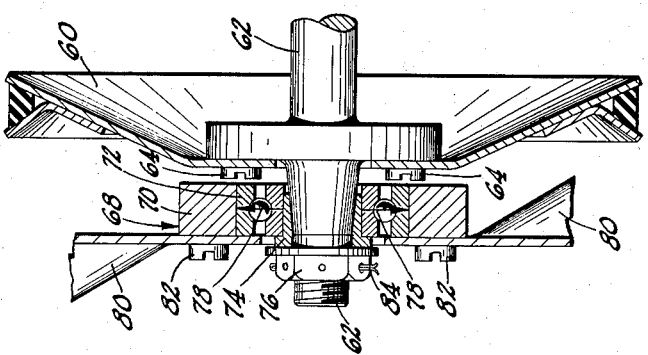
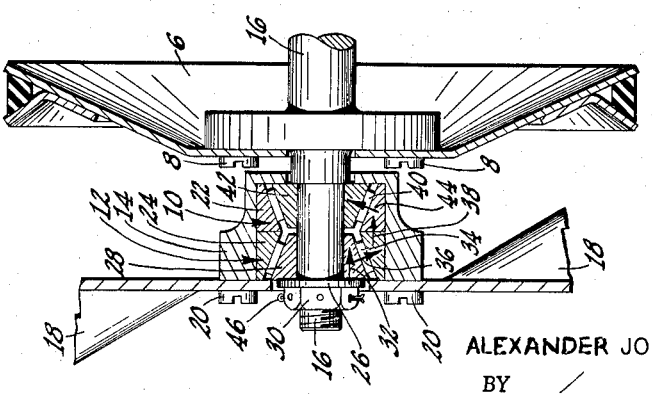
INVENTOR.
ALEXANDER JOHNSON
BY
ATTORNEY

United States Patent Office 2,974,504
Patented Mar. 14, 1961

2,974,504

AUTOMATIC FAN CONTROL

Alexander Johnson, 2 Hutchinson Court, Great Neck, N.Y.

Filed Apr. 21, 1958, Ser. No. 729,951

6 Claims. (Cl. 64—30)

This invention relates to an automatic fan control and more particularly to an apparatus and methods for automatically controlling the speed of vehicular cooling fans.

Heretofore it has been the practice to have cooling vehicular fans with small inefficient pitches. This was necessary to prevent high power plant loss at high speeds and also to prevent noise and vibration at these high speeds. Devices have been developed for releasing or automatically controlling the speed of fans. Some devices needed space and have been costly to produce, operate and maintain or have handled the problem in a manner which has not been satisfactory to the industry since it necessitated major changes to have these presently available controls incorporated into their cooling systems.

It is therefore the purpose of this invention to provide an automatic fan control device that will reduce power loss at high engine speeds or be interchangeable with the present fan assemblies, necessitating little or no alteration.

One object of this invention is to provide a fan control that is compact, requiring little or no additional space in the power plant of a truck or automobile.

Another object of my invention is to provide a fan requiring the same horsepower at high speeds as it does at low speeds of the motor shaft.

Another object of my invention is to allow a higher engine fan speed at idling since this speed will not increase appreciably at higher engine speeds.

A further object of my invention is to have a fan control that allows an increase of aerodynamic efficiency by allowing a higher pitch angle to be built into the blade of truck or automobile fans.

It is also an object of this invention to increase the safety of fans by reducing the speed fans have to rotate in trucks and automobiles at high engine speeds.

Other objects and features of the invention will appear as the description of the particular physical embodiment selected to illustrate the invention progresses. In the accompanying drawings which form a part of this specification, like characters of reference have been applied to corresponding parts throughout the several views which make up the drawings.

Fig. 1 shows a side section of the preferred embodiment of my fan control device.

Fig. 2 shows a side section of a modified form of my invention.

Fig. 3 shows another modified form of my invention.

To illustrate my invention I have disclosed for purpose of illustration only, and without intending to limit myself to this specific apparatus one type of mechanism which readily enables my invention to be carried into effect.

The apparatus I have employed to illustrate my invention may be briefly described as follows.

Referring to Fig. 1, drive pulley 6 is attached to shaft 16 with bolts 8. Shaft 16 is driven by any suitable power plant (not shown). The present invention, however, has been found to operate most satisfactorily in connection with the conventional interval combustion engine of an automobile. Bearings 10 and 12, are installed in housing 14. Housing 14, with the bearings 10 and 12, is then mounted onto shaft 16. Fan 18 is then attached to the housing of my fan control with bolts 20. When bolts 20 are tightened, the fan 18 forces the outer races 22 and 24 of bearings 10 and 12 against the housing as shown in Fig. 1. Next, washer 26 is slipped onto shaft 16 against the inner race 28 of bearing 12 and nut 30 is screwed onto shaft 16 and properly torqued to cause a lateral force to the inner race 28 as shown by arrow 32. The lateral force 32 then transmits an outward force to rollers 34 against the outer race 24 of bearing 12 as shown by arrow 36. This also causes a lateral force against the outer race 22 of bearing 10 as shown by arrow 38. The lateral force 38 then transmits a frictional inward force to rollers 40 against the inner race 42 of bearing 10 as shown by arrow 44. The inner race 42 cannot move laterally due to the shaft 16. After nut 30 is properly torqued it is locked onto the shaft by cotterpin 46.

The forces shown by arrows 36 and 44 induce a proper amount of friction to be manifested within bearings 10 and 12 so as to induce a preload in said bearings such that, when the shaft 16 is rotated by the powerplant (not shown) driving the inner races 28 and 42, it will in turn drive the outer races 24 and 22 through rollers 34 and 40, and thus drive the fan 18, but at lower speed depending on the rotational speed of the shaft 16 and the torque applied to nut 30. The lower speed is due to the fact that by increasing the speed of the shaft the kinetic coefficient factor of the frictional force within the bearings is decreased and the rotational force acting upon the outer races through the inner races is lowered. Also as the fan tends to increase in speed the air load against the blades increases and tends to decrease the fan speed since the fan is connected to the shaft by the induced friction and not in direct mechanical means.

Referring to Fig. 2, a single bearing 72 is employed. Pulley 60 is attached to tapered shaft 62 with bolts 64. Next, bearing assembly 68 which is made up of bearing housing 70 and bearing 72, is mounted on shaft 62. Tapered bushing 74 is pressed in the inside diameter of bearing assembly 68. Nut 76 is screwed onto shaft 62 and properly torqued so that tapered bushing 74 induces an outward force on the inner race of bearing 72 as shown by arrows 78. This causes a preload to be induced in said bearing so that fan 80 which is attached to housing 70 by bolts 82 will rotate at lower speeds as explained hereinabove for the preferred embodiment shown in Fig. 1. Also locking means for nut 76 on shaft 62 is provided by cotterpin 84, preventing a change of frictional force on bearing 72.

In Fig. 3, pulley 90 is bolted onto shaft 92 by bolts 94. Tapered bushing 96 is slipped onto shaft 92 and bearing assembly 98 is placed on tapered bushing 96. Bearing assembly 98 is comprised of housing 100 and bearing 102. Next, fan 104 is attached to housing 100 by bolts 105. The tapered bushing 106 is then slipped into bushing 96. Next nut 108 is properly torqued onto shaft 92 and locked in place by cotterpin 109, effecting an outward force by the tapered bushings 96 and 106 onto bearing 102 as shown by arrows 110. This causes a frictional force to be induced in bearing 102 so that fan 104 will rotate but at a lower speed as described hereinabove in connection with the preferred embodiment shown in Fig. 1.

It will be understood that nut 30 of Fig. 1, nut 76 of Fig. 2 and nut 108 of Fig. 3 may be adjusted to vary the speed of the fan so as to increase or decrease the cooling capacity of said fan.

It will be apparent from the foregoing description that I have provided an improved fan control device which is capable of keeping the fan speed rotation at a much lower speed relative to the shaft speed of the engine when the engine is running at its higher level of speeds. At this high speed of the vehicle the cooling is accomplished by the air rammed through the front of the vehicle and cooling by the fan itself is not necessary.

The invention hereinabove described may therefore be varied in construction within the scope of the claims, for the particular device selected to illustrate the invention is but one of many possible embodiments of the same. The invention, therefore, is not to be restricted to the precise details of the structure shown and described.

What I claim is:

1. A coupling for automatically controlling the speed of an engine fan for vehicles comprising a power plant pulley, a shaft driven by said pulley, a set of tapered bushings mounted on said shaft one inside the other, a bearing assembly having an inner race and an outer race, plurality of balls interposed between said inner race and said outer race, said inner race circumferentially mounted around said bushings, a housing attached to the outer race of said bearing assembly, a fan attached to said housing and a nut threaded on said shaft and torqued onto said shaft to cause a lateral force on said tapered bushing to force the said bushing outwardly against the inner race of said bearing assembly so as to induce a frictional force between the inner and outer races of said bearing assembly.

2. A coupling for automatically controlling the speed of an engine fan comprising a shaft, means to drive said shaft, a bearing assembly having inner and outer races circumferentially mounted to said shaft, plurality of members interposed between said inner race and said outer race, to promote rotation of said outer race around said inner race, a housing mounted on said bearing assembly, a fan attached to said housing and a screw torqued on said shaft to produce a lateral force against the races of said bearing assembly, said force inducing a frictional load between the inner and outer races of said bearing assembly so as to drive said fan by said induced frictional load.

3. A coupling for automatically controlling the speed of an engine fan comprising a tapered shaft, a tapered bushing mounted on said tapered shaft, a bearing assembly having inner and outer races located around said bushing, plurality of members interposed between said inner race and said outer race, to promote rotation of said outer race around said inner race, a housing mounted around said bearing assembly, a fan attached to said housing, and means to force said bushing laterally towards the larger diameter of said shaft so as to cause a radial outward force on said bushing against the inner diameter of said bearing assembly inducing a pre-determined frictional load in said bearing assembly to drive said fan directly by said shaft.

4. A coupling for automatically controlling the speed of an engine fan comprising a rotatable shaft, means to rotate said shaft, a member around said shaft stressed radially away from said shaft and rotatable with said shaft, another member around said first member free to rotate at different speeds than said first member, plurality of members interposed between said first member and said other member, to promote rotation of said other member around said first member, a fan attached to said second member and an adjustment member mounted on the front of said shaft to control the radial force of said first member against said second members to induce a frictional force between said members so that said first member drives said second member at a speed depending on the radial force between said members.

5. A coupling for automatically controlling the speed of an engine fan comprising a rotatable shaft, means to rotate said shaft, a roller bearing assembly having at least one conical inner member and at least one conical outer member, said inner member mounted on said shaft and rotatable with said shaft and being free to move axially on said shaft, and said outer member being free to move radially outwardly, a plurality of rollers interposed between said inner member and said outer member to provide rotation of said outer member by said inner member, a fan attached to said outer member and a nut threaded on said shaft and forced axially against said inner member so as to induce a frictional force between the inner member, through said rollers, to the outer member.

6. A coupling for automatically controlling the speed of an engine fan comprising a shaft, a bearing assembly having inner and outer races, circumferentially mounted on said shaft, plurality of members interposed between said inner and said outer races, to promote rotation of said outer race around said inner race, a housing circumferentially mounted around said outer race and rotatable with said outer race, a fan attach to one side of said housing and a torque means mounted to said shaft to induce a frictional force between said inner and said outer race.

References Cited in the file of this patent

UNITED STATES PATENTS

| | | |
|---|---|---|
| 1,233,518 | Snyder | July 17, 1917 |
| 1,482,498 | Willis | Feb. 5, 1924 |
| 1,612,954 | Trbovevich | Jan. 11, 1927 |
| 1,781,173 | Green | Nov. 11, 1930 |
| 1,861,088 | Hamel | May 31, 1932 |
| 2,132,928 | Blanchard | Oct. 11, 1938 |